May 24, 1927.
C. W. BORG
ANIMAL TRAP
Filed Dec. 4, 1926
1,629,649
2 Sheets-Sheet 2
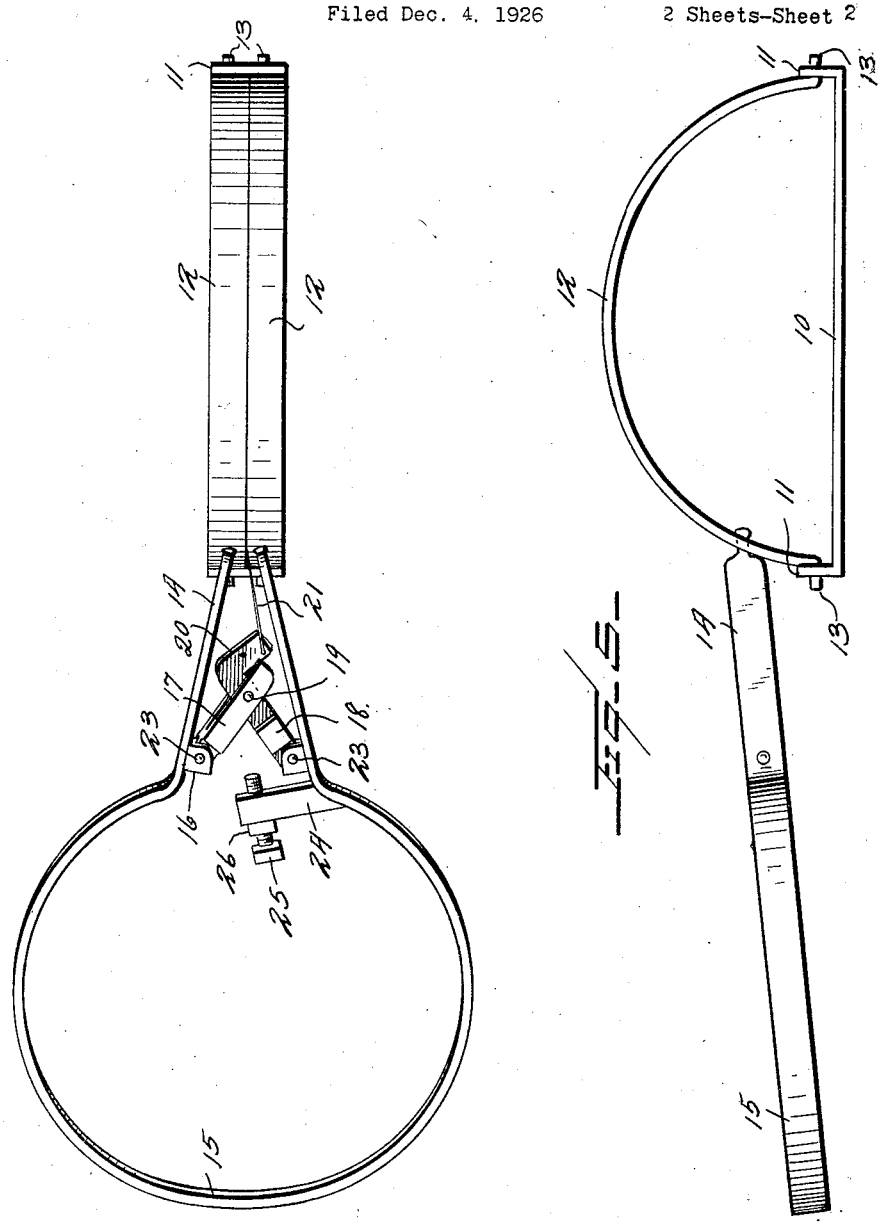

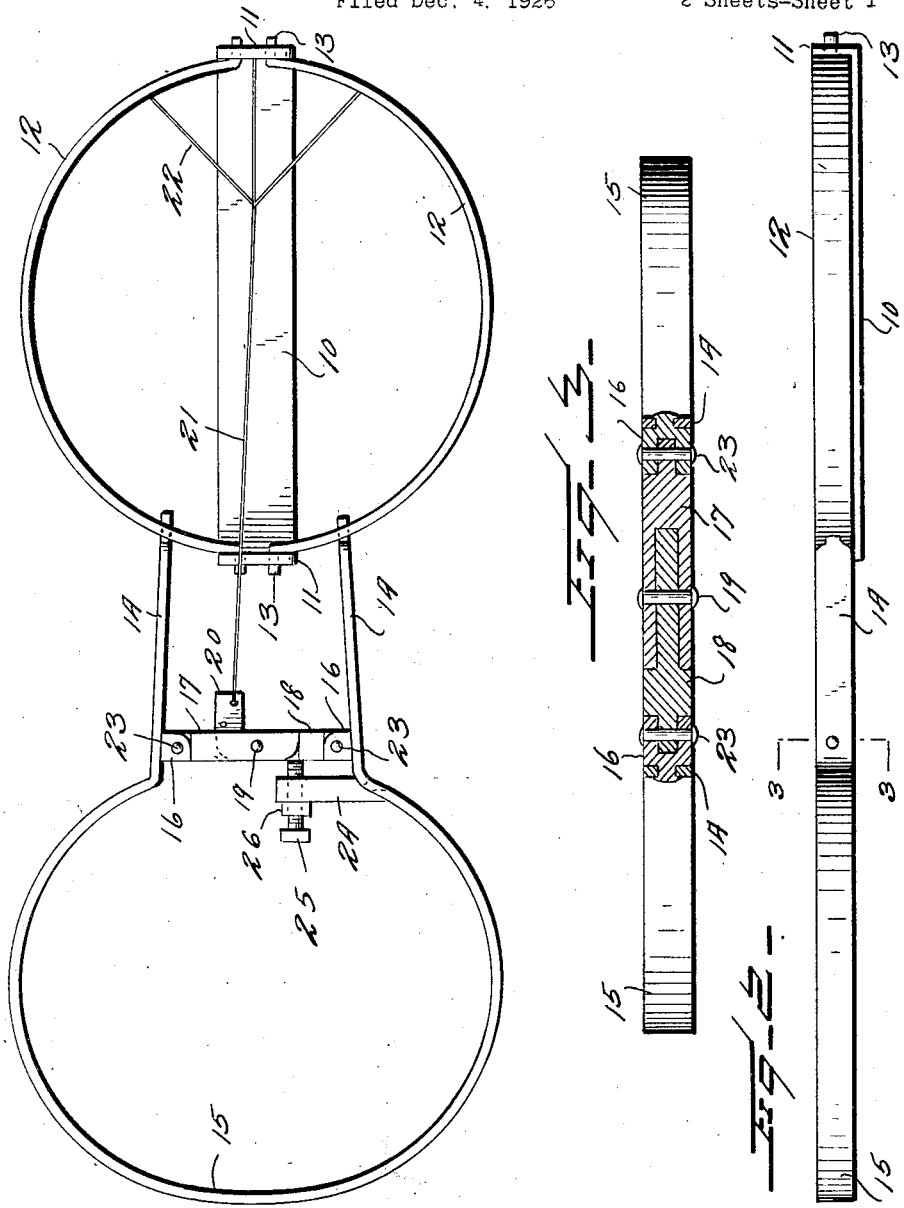

Patented May 24, 1927.

1,629,649

UNITED STATES PATENT OFFICE.

CARL W. BORG, OF ABERDEEN, WASHINGTON.

ANIMAL TRAP.

Application filed December 4, 1926. Serial No. 152,641.

This invention relates to traps of that character wherein there are two opposed, pivoted jaws, a spring urging the jaws towards each other, and means for holding the jaws apart, which means is released by a trigger.

The general object of the present invention is to provide means for holding the jaws apart which is adjustable so that either a light pull, a heavy pull, or a medium pull upon the trigger cord or other releasing device of the trap, may release the spring and jaws and permit the jaws to close.

A further object is to provide a trap of this character which may be used either attached to a tree, a log, which may be disposed in the track of an animal, or under water and which will still operate properly.

A still further object is to provide a trap in which the latching or jaw holding means is automatically set to hold the trap jaws open when the trap jaws are manually opened.

Other objects will appear in the course of the following description.

My invention is illustrated in the accompanying drawings wherein:—

Figure 1 is a top plan view of a trap constructed in accordance with my invention, the jaws being opened;

Fig. 2 is a side elevation of the structure shown in Figure 1;

Fig. 3 is a section on the line 3—3 of Figure 2;

Fig. 4 is a like view to Figure 1 but showing the jaws closed;

Fig. 5 is an elevation of the trap with the jaws closed.

Referring to the drawings it will be seen that 10 designates a base having upturned ends 11. Opposed jaws 12 are provided, each of these jaws being angularly bent at its ends, as at 13, to engage in the ears 11. Any other means for pivotally supporting the jaws upon the base 10 may be used. Connected to both jaws are the legs 14 of a circular spring 15 which may be of any suitable form. The legs 14 at their extremities are reduced and inserted in apertures in the jaws 12 and the tendency of the spring is to cause the legs to move towards each other and thus urge the jaws to a closed position.

Each leg of the spring is provided with a bifurcated ear 16 and pivoted in these ears are the links 17 and 18 which overlap each other and are pivoted to each other by a pin 19. Preferably one of these links as, for instance, 17 is bifurcated and the other formed with a tongue insertible into this bifurcation. The link 18 is shown as provided with an outwardly projecting lug 20 to which a cord 21 is attached, the opposite end of this cord being connected to the outer lug or ear 11 and preferably also by branch cords 22 to the jaws 12. When the brace or latch formed by the links 17 and 18 is in the position shown in Figure 1, with the links 17 and 18 in alignment or with the pivot pin 19 inward of a line extending through the pivot pins 23, the jaws will be held open but when these links are pulled forward into angular relation or broken, as shown in Figure 4, the jaws will close under the influence of the spring 15.

For the purpose of controlling the degree to which the links 17 and 18 may move toward an aligning position, I mount upon the spring 15 adjacent one of the arms 14, a bracket 24. Passing through this bracket is the stop screw 25 held in adjusted position by the lock nut 26. If this stop screw is withdrawn to a greater extent than shown in Figure 1, the pivoted links 17 and 18 may bow in slightly towards this stop screw and a considerable pull upon the trigger cord 21 will be necessary in order to pull the links past their center and permit the jaws to close. If, on the other hand, the screw 25 be turned inward to or even slightly beyond the position shown in Figure 1, it is obvious that the links can only be shifted into alignment with each other or to a position nearly in alignment, and in that case only a relatively slight pull upon the cord 21 will be necessary in order to shift the pivoted ends of the links past the center extending through the pivot pins 23 and the pivot 19. Thus, by means of this stop screw 25, the point at which the trap will be sprung may be determined and while this screw 25 is set in this position, the trap will always "spring" under a certain tension and will not spring under a less tension.

Bait may be mounted upon the cord 21 or mounted upon the base 10 or the trap may be disposed across a pathway where an animal will be likely to strike the trip cord 21. This trap may be set across the favorite runway of an animal, at the entrance of a hole, it may be attached to a tree or log, or placed beneath the water, and it will act under any of these circumstances. By adjusting the tension at which the trap can be sprung, small animals which would otherwise be trapped, may be prevented from actuating the trap and only larger animals will be caught. Thus the trap is adjustable to animals of various kinds. The trap is extremely simple, light, and readily handled, and it will be seen that what may be termed the latch or trigger of the trap is self-setting in that when the jaws are manually opened, the legs 14 of the spring are forced apart and this automatically brings the links 17 and 18 into or nearly into alignment with each other, the position of these links being determined by adjusting the screw 25. It is not necessary, therefore, to open the jaws and then set any latch or trigger. The cord 21 may be of such length that when the links 17 and 18 are disposed in alignment or nearly so, the cord 21 will be tensioned to a proper degree.

I claim:—

1. A trap comprising a base, opposed jaws pivoted upon the base for movement towards or from each other, an approximately U-shaped spring having legs engaging the jaws, the spring urging the jaws towards each other, and means for holding the jaws apart comprising a pair of overlapping links pivoted to the legs of the spring and pivoted to each other, a stop for limiting the movement of the legs past their pivotal centers in one direction, and a trip connection connected to one of said links and when struck pulling the links past their centers in the other direction.

2. A trap comprising a base, opposed jaws pivoted upon the base for movement toward or from each other, an approximately U-shaped spring having legs engaging the jaws, the spring urging the jaws towards each other, and means for holding the jaws apart comprising a pair of overlapping links pivoted to the legs of the spring and pivoted to each other, an adjustable stop mounted upon the spring on that side of the links remote from the jaws and limiting the movement of the links past their centers in this direction, and a trip connection connected to one of said links and when struck pulling the links past their centers in the other direction.

3. A trap of the character described comprising a base having upstanding lugs, oppositely disposed bowed jaws pivoted at their ends in said lugs, an approximately U-shaped spring having legs extending into said jaws, overlapping links, each pivoted to one of said legs, the links being pivoted to each other and one of said links having an angularly projecting portion, a trip cord attached to the angularly projecting portion at one end and at its other end attached to the body of the trap, a bracket extending from said spring behind one of said links, and a screw adjustable through said bracket to limit the extent to which the links may be shifted beyond their pivotal centers in this direction.

In testimony whereof I hereunto affix my signature.

CARL W. BORG.